United States Patent Office 3,431,231
Patented Mar. 4, 1969

3,431,231
SILICA AND SILICA-CONTAINING
VULCANIZATES
Jules Darcy and John R. Dunn, Sarnia, Ontario, Canada, assignors to Polymer Corporation Limited, Sarnia, Ontario, Canada, a body corporate and politic
No Drawing. Filed Jan. 23, 1967, Ser. No. 610,816
Claims priority, application Canada, Feb. 9, 1966, 951,803
U.S. Cl. 260—41.5
Int. Cl. C08c 11/02
5 Claims

ABSTRACT OF THE DISCLOSURE

An aminated non-pyrogenic siliceous oxide having an amine essentially all bound thereto in an amount equivalent to at least 0.5 part by weight of nitrogen per 100 parts by weight of oxide. The oxide has an average particle size of less than 50 microns. The amine is selected from alkylene diamines, polyalkylene polyamine, thiourea, monoalkanolamines and alkylene amines where alkylene and alkanol are radicals having 2 to 5 carbon atoms. The oxide may be used for form vulcanizable compositions with rubbery polymers.

---

This invention relates to chemically modified silica materials and their use in the preparation of rubber vulcanizates.

Silica materials such as ground quartz or or diatomaceous earth have been used for many years as fillers in the compounding of rubber. Recently, there has been made available a type of an essentially amorphous silica, also known as a precipitated silica, which improves the mechanical properties of white filled compounds of rubber. Its use, however, results in a slow cure and poor ageing properties of vulcanizates.

It is the object of this invention to provide a modified siliceous oxide. Another object is to provide a process of preparing a vulcanizate containing a modified siliceous oxide. Still another object is to provide a vulcanizate having improved resistance to ageing.

We have found that the aminated non-pyrogenic siliceous oxides as herein below defined are superior to the unmodified siliceous oxides having the same particle size in that the rubber compounds containing them readily cure to produce materials having improved ageing stability.

The objects of the invention have been achieved in providing an aminated non-pyrogenic siliceous oxide having an amine essentially all bound thereto in an amount equivalent to at least about 0.5 part by weight of nitrogen per 100 parts by weight of the oxide, said oxide having an average particle size of less than 50 millimicrons, and said amine being selected from the group consisting of alkylene diamines, polyalkylene polyamines, thiourea, monoalkanolamines and alkylene imines where alkylene and alkanol are radicals having 2–5 carbon atoms.

In accordance with the invention there is provided a process of preparing a vulcanizate of a rubbery polymer which comprises compounding said polymer with an aminated non-pyrogenic siliceous oxide having an amine essentially all bound thereto in an amount equivalent to at least about 0.5 part by weight of nitrogen per 100 parts by weight of the oxide, said oxide having an average particle size of less than 50 millimicrons, and said amine being selected from the group consisting of alkylene diamines, polyalkylene polyamines, thiourea, monoalkanol amines and alkylene imines, where alkylene and alkanol are radicals having 2–5 carbon atoms, and vulcanizing the compound.

The aminated siliceous oxide of this invention is a non-pyrogenic, precipitated, hydrated silica of very fine average particle size of less than 50 millimicrons. Such siliceous oxide may be prepared by precipitating silica from a sodium silicate solution by use of carbon dioxide, whereby an amorphous structure results, and aminating the precipitated product. One commercial example of a non-modified amorphous, non-pyrogenic, silica available under the trademark of Hi-Sil 233, has the following typical properties:

| | | |
|---|---|---|
| $SiO_2$ | percent | 89.2 |
| CaO | do | 0.6 |
| $Al_2O_3$ and $Fe_2O_3$ | do | 0.78 |
| NaCl | do | 1.5 |
| Loss at 105° C. | do | 5.2 |
| Total ignition loss at 1200° C. | do | 9.3 |
| pH of 5% water suspension | | 6.5–7.3 |
| Specific gravity in rubber | | 2.0 |
| Ultimate particle size | millimicrons | 22 |
| Colour | | White |
| Refractive index | | 1.46 |
| Oil absorption (Gardner-Sevard), grams oil per 100 grams silica | | 125–165 |
| Surface area, square meters per gram | | 140–160 |

Another commercially available non-modified silica of this type is available under the trademark of Ultra Sil VN–3.

The non-modified siliceous oxide is aminated with a variety of amines of which the aliphatic amines are particularly suitable. Amines containing one amine group and at least one other polar group selected from hydroxyl and amine groups are preferred. More specifically the amines are selected from the group of polyalkylene polyamines represented by the structural formula $$NH_2\text{—}(R\text{—}NH)_n\text{—}R\text{—}NH_2$$

where R is an alkylene radical having 2 to 5 carbon atoms and $n$ is 0–3. Representative examples are ethylene diamine, 1,3-propylene diamine, 1,2-propylene diamine, diethylene triamine (also known as 2,2′-diamine diethylamine) and dipropylene triamine (also known as 3,3′-diamine dipropylamine). Also included in the amines which may be used in the amination are thiourea, monoalkanolamine such as monoethanolamine and alkylene imine such as ethylenimine, propylenimine or their polymers.

The amine is used in amounts sufficient to result in an aminated siliceous oxide having 0.5 to 5.0 percent by weight of nitrogen chemically combined. The optimum amount of a specific amine to be used with a particular silica may be determined by those skilled in the art and it is preferred that the modified siliceous oxide contains about 1.5 to 3.5% by weight nitrogen.

The amination of the siliceous oxide may be accomplished in the gaseous state at an elevated temperature, preferably in a closed system. The modification may also be effected by contacting the siliceous oxide with a solution of the amine, preferably at a temperature between the boiling point of the amine and about 50° C. above the boiling point. The solvent may be water, alcohol, benzene, hexane, etc., the choice being guided by such factors as solubility of amine, boiling point and chemical stability. Although the contact time of the siliceous oxide with the amine depends on the particular amine and on the temperature, the process is generally completed in about one to two hours. After the treatment, residual free amine is removed by washing or evaporation under vacuum. The exact nature of the bond between siliceous oxide and amine in the aminated product is not known. It is believed that amine reacts with acidic or other reactive sites on non-pyrogenic siliceous oxide and is firmly bonded thereto.

As indicated above, the process of aminating the siliceous oxide may vary, and the following three methods were used by the applicants:

(A) Gaseous treatment

Siliceous oxide was placed in a stainless steel, thermostatically-controlled autoclave equipped with a pressure rupture disc. Amine was introduced and the temperature of the contents of the autoclave was then raised to 50–60° C. above the boiling point of the amine. After a period of not less than one hour, the pressure on the autoclave was released, but the temperature was maintained so as to expel unreacted amine and any volatile reaction products. After cooling to room temperature, the aminated siliceous oxide was removed, ball-milled to break up any lumps, passed through a 25–50 mesh sieve, and finally dried at an elevated temperature to remove traces of free amine.

(B) Aqueous treatment

The amine was dissolved in distilled water to a 1-molar solution and placed in a three-necked, round bottomed flask equipped with a paddle-type stirrer, thermometer, and reflux condenser. A known weight of siliceous oxide was then introduced, while stirring, and heat was supplied by an electric heating mantle to maintain a temperature of 100° C. The mixture was kept under reflux for about two hours. On cooling, the modified siliceous oxide was filtered from the solution, washed with distilled water 3–5 times to remove residual free amine and then dried.

(C) Treatment in organic solvent

This method was essentially the same as that employed in B except that an organic solvent, such as toluene, was substituted for the water, and the temperature adjusted to the boiling point of the solvent.

The aminated siliceous oxide of this invention, prepared as described hereinabove, is suitable for use as a filler in compounding vulcanizable rubber and in the production of non-black vulcanizates having satisfactory physical properties and good resistance to ageing.

The rubbery polymers included within the scope of this invention are synthetic rubbers produced by either emulsion or solution polymerization techniques. Polymers of conjugated $C_4$–$C_6$ open chain multi-olefinic hydrocarbons such as butadiene-1,3, isoprene, 2,3-dimethyl butadiene are preferred. They may be homopolymers such as polybutadiene or copolymers with comonomers containing the vinylidene group,

such as styrene, alpha-alkyl styrene, acrylonitrile, vinyl pyridine, and the $C_1$–$C_4$ alkyl acrylates. The copolymers having at least 60% by weight of butadiene units with a minor proportion of styrene or of acrylonitrile units are preferred. Blends of two or more polymers of conjugated diolefins may also be employed in the practice of this invention. It is to be understood that where the term "rubbery polymer" is used herein, it includes the aqueous latex thereof, for such a latex is also compounded with siliceous oxides in the production of many light coloured goods.

In general, the amount of siliceous oxide used with a rubbery polymer may vary from 10% to 75% by weight of a rubbery polymer, the preferable range is about 20–50%.

Rubbery polymers as above described may be compounded with other fillers if desired such as zinc oxide, calcium carbonate, clays, etc; softeners such as stearic acid, pine tar or petroleum processing oils; and curing ingredients such as sulfur and accelerators, then these compounded stocks are shaped and vulcanized by methods well known in the rubber art of compounding with non-black pigments.

The present process may be applied to form useful articles such as wire insulation, white sidewall strips for tires, rolls and various shaped, extruded or sheeted goods. Where prepared from latex, the goods include film-castings, foam rubber and the like.

Illustrative examples are set forth as follows to typify the practice of this invention.

EXAMPLE I

Three hundred grams of an amorphous, precipitated silica available under the trademark of Hi-Sil 233, was aminated with 0.95 mole of 3,3-diaminodipropylamine at 95° C. using the method B described hereinabove.

This aminated silica was then compounded in the following recipe with a copolymer of butadiene and styrene prepared by emulsion polymerization at 13° C. and having about 28 parts by weight of styrene incorporated in the polymer. The compounding recipe was as follows:

| | Parts by weight |
|---|---|
| Butadiene-styrene copolymer rubber | 100 |
| Silica | 40 |
| Zinc oxide | 5 |
| Sulfur | 2 |
| Benzothiazyl disulphide | 1.75 |

A control compound with the unmodified silica was also prepared using this recipe.

Two sets of specimens were cured for 100 minutes at 145° C. The one set was then tested for stress-strain properties. The other set was aged for a period of 5 days at the elevated temperature of 100° C. and then tested for stress-strain properties. The data showing physical properties of the vulcanizates containing unmodified and modified silicas, unaged and aged, are given in Table I.

A second aminated silica, prepared by treating 250 grams of Hi-Sil 233 silica with one mole of 1,2-propylene diamine at 95° C. using the aqueous method B hereinabove described, was used in the preparation of Compound 2. Physical test data on vulcanizates with this second silica are also shown in Table I.

A third aminated silica was prepared by treating 300 grams of Hi-Sil 233 silica with diethylene triamine at 100° C. using Procedure B. It was used in the preparation of Compound 3 which was vulcanized and tested as shown in Table I.

TABLE I

| Compound | Type of silica | Nitrogen content (percent by wt.) | Unaged | | | Aged in air at 100° C. for 5 days | | |
|---|---|---|---|---|---|---|---|---|
| | | | Tensile (kg./cm.²) | Elongation at break (percent) | Modulus at 100% elongation (kg./cm.²) | Tensile (kg./cm.²) | Elongation (percent) | Modulus at 100% elongation (kg./cm.²) |
| Control | Unmodified | 0 | 140 | 1,100 | 6.3 | 151 | 630 | 12.6 |
| 1 | Modified with 3,3-diamino-dipropyl-amine. | 1.4 | 236 | 680 | 9.2 | 156 | 520 | 21.1 |
| 2 | Modified with 1,2-propylene diamine | 2.3 | 287 | 760 | 14.8 | 204 | 450 | 27.0 |
| 3 | Modified with diethylene triamine | 1.8 | 235 | 650 | 13.7 | 170 | 500 | 22.8 |

The data in Table I show that using the aminated silicas in Compounds 1 to 3, superior tensile was obtained before and after ageing, together with an attractive balance of elongation and modulus values.

An associated experiment was carried out, wherein unmodified Hi-Sil 233 silica was mixed with the rubbery polymer and then into this mixture was incorporated 1,2-propylene diamine in a proportion of one mole per 250 grams of Hi-Sil 233. The amine was not easily compounded and the compound was vulcanized to a product having low tensile strength. The addition of 1,2-propylene diamine during compounding appears to be impractical.

EXAMPLE II 300 grams of the Hi-Sil 233 silica was reacted with one mole of thiourea employing Procedure B at a temperature of 100° C. The product was analyzed for bound nitrogen and found to contain 1.8 percent by weight as elemental nitrogen.

This aminated silica was compounded in a rubber, vulcanized for 50 minutes at 145° C. and tested as in Example I. The unmodified silica was also used for comparison in a control compound additionally containing 4.5 parts of ethylene glycol and 0.875 part of benzothiazyl disulphide. These additional components were added to overcome the cure retardation of the unmodified silica.

TABLE II

| Recipe Variables | Compound | |
|---|---|---|
| | 1¹ Unmodified silica with super acceleration | 2 Modified silica |
| Unaged (cured 50' at 145° C.): | | |
| Tensile (kg./cm.²) | 267 | 222 |
| Elongation, at break (percent) | 640 | 670 |
| Modulus at 100% elongation (kg./cm.²) | 14.1 | 16.9 |
| Aged in air at 100° C. for 5 days: | | |
| Tensile (kg./cm.²) | 120 | 166 |
| Elongation (percent) | 350 | 550 |
| Modulus at 100% (kg./cm.²) | 27.8 | 18.6 |

¹ Control.

Table II shows that superior ageing properties are obtained in a compound containing the thiourea-modified silica.

EXAMPLE III

Two samples of silica aminated with monoethanol amine were used as fillers in the preparation of two compounds in the recipe of Example I. The first sample was prepared by treating 380 grams of the Hi-Sil 233 silica with one mole of monoethanol amine at 280° C. using the gaseous treatment A as hereinbefore described. It contained the amine in the bound form in an amount equivalent to 0.99 percent by weight of the silica of nitrogen. The second sample was prepared by treating 300 grams of the Hi-Sil 233 silica with one mole of monoethanol amine at 96° C. using the aqueous treatment B. It analyzed 0.68 percent by weight of the aminated silica of nitrogen.

The compounds were vulcanized at 145° C. for 100 minutes and the vulcanizates were tested for stress-strain properties before and after 5 days ageing at 100° C. The results are shown in Table III.

TABLE III

| | Compound | |
|---|---|---|
| | 1 | 2 |
| Silica aminating treatment | A (Gaseous) | B (Aqueous) |
| Unaged: | | |
| Tensile (kg./cm.²) | 236 | 258 |
| Elongation at break (percent) | 680 | 760 |
| Modulus at 100% elongation (kg./cm.²) | 15.1 | 13.7 |
| Aged in Air at 100° C. for 5 days: | | |
| Tensile (kg./cm.²) | 125 | 178 |
| Elongation (percent) | 380 | 525 |
| Modulus (kg./cm.²) | 27.1 | 21.8 |

Table III shows that the silica treated with monoethanol amine is suitable for use as a filler in the production of rubber vulcanizates having satisfactory ageing properties. The aminated silica produced by the aqueous method is preferred over the silica aminated in the gaseous state.

EXAMPLE IV

Another aminated silica was prepared from 300 grams of Hi-Sil 233 silica and 0.75 mole of ethylene imine using Procedure C. It showed a nitrogen content of 1.4% by weight. A compound was made in the formulation of Example I using this silica and vulcanized at 145° C. for 100 minutes. The stress-strain tests were performed on unaged and aged vulcanizates and results are recorded in Table IV.

TABLE IV

| | Unaged | Aged in air at 100° C. for 5 days |
|---|---|---|
| Tensile (kg./cm.²) | 305 | 204 |
| Elongation at break (percent) | 650 | 410 |
| 100% modulus (kg./cm.²) | 12.3 | 31.0 |

EXAMPLE V

A polybutadiene prepared by Ziegler-type solution polymerization containing about 95 percent of the structural units in the cis configuration, and having a Mooney viscosity, ML-4 at 100° C. of about 40, was compounded in the following recipe with a silica, Hi-Sil 233, modified with 1 mole of 1,2-propylene diamine per 380 grams silica by Procedure A at 233° C. The modified silica analyzed 2.3% elemental nitrogen.

| | Parts by weight |
|---|---|
| Polybutadiene rubber | 100 |
| Carbon black, an intermediate super abrasion furnace type | 60 |
| Silica—aminated | 20 |
| Zinc oxide | 5 |
| Stearic acid | 5 |
| Polymerized trimethyl dihydroquinone (available under the name AgeRite Resin D) | 1 |
| Condensation product of diphenylamine and acetone (antioxidant known as BLE) | 0.3 |
| N-cyclohexyl-2 benzothiazole sulphenamide | 0.7 |
| Sulfur | 2 |

The compound was cured at 153° C. for 15, 30 and 60 minutes, respectively. Stress-strain data were obtained and are given in Table V.

TABLE V

| | Cure time (minutes) | | |
|---|---|---|---|
| | 15 | 30 | 60 |
| Tensile (kg./cm.²) | 147 | 150 | 151 |
| Elongation (percent) | 360 | 370 | 370 |
| Modulus at 300% elongation (kg./cm.²) | 116 | 104 | 96 |

The above table shows that the compound with 20 parts of aminated silica successfully cures in about 15 minutes and is relatively insensitive to prolonged cure times.

EXAMPLE VI

This example illustrates the improvement in tensile strength in a butadiene-acrylonitrile copolymer compounded with a modified silica filler of this invention.

Two modified silicas were evaluated:

(A) The third aminated silica of Example I, i.e. Hi-Sil 233 modified with 1 mole of diethylene triamine per 300 grams silica, and (B) The aminated silica of Example IV, i.e. 300 grams of Hi-Sil 233 modified with 0.75 mole of ethylene imine.

These aminated silicas were compared in the following compound recipe to the unmodified silica. The polymer used was a butadiene/acrylonitrile copolymer containing 33 weight percent acrylonitrile, having a Mooney viscosity ML-4 at 100° C. of 84, and having been prepared by emulsion polymerization at 13° C.

| | Parts by weight | |
|---|---|---|
| | Control | Aminated |
| Polymer | 100 | 100 |
| Hi-Sil 233 | 107 | 57 |
| Aminated silica | | 50 |
| Cumar P-25* | 10 | 10 |
| Dibutyl phthalate | 10 | 10 |
| Zinc oxide | 5 | 5 |
| Stearic acid | 1 | 1 |
| Benzothiazyl disulphide | 1.5 | 1.5 |
| Sulfur | 1.5 | 1.5 |

*Cumar P-25—Trade name for a coumarone-indene plasticizer resin having a specific gravity of about 1.085 and a melting point range of 20-30° C.

The compound specimens were cured at 153° C. for the times shown in Table VI. The specimens were tested for their stress-strain properties on an Instron tester, before and after ageing at 100° C. for 7 days, the results being tabulated in Table VI. Also shown for comparison are test data on unaged samples cured for 15 minutes.

|  | Cure time (hr.) | Compound | | |
|---|---|---|---|---|
|  |  | [1]1 | 2 | 3 |
|  |  | Silica type | | |
|  |  | Non-modified | Modified A | Modified B |
| Unaged: |  |  |  |  |
| Tensile at break, (kg./cm.²) | 15 | 281 | 136 | 173 |
|  | 90 | 175 | 214 | 242 |
| Elongation at break, (percent) | 15 | 500 | 480 | 520 |
|  | 90 | 330 | 410 | 405 |
| Modulus at 100% elongation (kg./cm²) | 15 | 21.8 | 35.9 | 37.6 |
|  | 90 | 70.0 | 58.0 | 59.1 |
| Aged 7 days at 100° C.: |  |  |  |  |
| Tensile (kg./cm.²) | 90 | 210 | 230 | 279 |
| Elongation (percent) | 90 | 240 | 280 | 280 |
| Modulus at 100% (kg./cm.²) | 90 | 116 | 90 | 121 |

[1] Control.

These data show superiority in the stress-strain properties, before and after ageing, of the vulcanizates prepared using the aminated silicas of this invention.

What is claimed is:

1. A process for the production of a white filled vulcanizate of a synthetic polymer of a conjugated $C_4$–$C_6$ open chain multi-olefinic hydrocarbon monomer, said vulcanizate having improved resistance to ageing, which comprises compounding 100 parts by weight of said polymer with 10–75 parts by weight of aminated, non-pyrogenic siliceous oxide and vulcanizing the resulting compound; said siliceous oxide having essentially all chemically bound thereto an amine in an amount equivalent from 0.5 to 5.0 parts by weight per 100 parts by weight of siliceous oxide; said oxide having an average particle size of less than 50 millimicrons; said amine being selected from thiourea and alkylene imines where alkylene is a radical having 2 to 5 carbon atoms.

2. The process of claim 1 wherein the siliceous oxide has an average particle size between 10 and 35 millimicrons, a surface area of about 150 square meters per gram and a silica content of at least 85 percent by weight.

3. The process of claim 2 wherein the said amount of chemically bound amine is equivalent to 1.5 to 3.5 percent by weight of nitrogen.

4. The process of claim 3 wherein the polymer is a copolymer rubber of butadiene-1,3 and a styrene.

5. The process of claim 3 wherein the polymer is a copolymer rubber of butadiene-1,3 and an acrylic nitrile.

References Cited

UNITED STATES PATENTS 2,578,605 12/1951 Sears et al.
2,692,871 10/1954 Pechukas.
2,867,540 1/1959 Harris.
2,892,807 6/1959 Sellers et al.

ALLAN LIEBERMAN, *Primary Examiner.*

SAMUEL L. FOX, *Assistant Examiner.*

U.S. Cl. X.R.

106—308